United States Patent
Yanamoto (10) Patent No.: US 8,462,941 B2
(45) Date of Patent: Jun. 11, 2013

(54) ENCRYPTED STREAM PROCESSING CIRCUIT AND METHOD OF PROCESSING ENCRYPTED STREAM

(75) Inventor: Kaoru Yanamoto, Kanagawa (JP)

(73) Assignee: Sony Corporation (JP)

( * ) Notice: Subject to any disclaimer, the term of this patent is extended or adjusted under 35 U.S.C. 154(b) by 619 days.

(21) Appl. No.: 12/384,740

(22) Filed: Apr. 8, 2009

(65) Prior Publication Data
US 2009/0257584 A1      Oct. 15, 2009

(30) Foreign Application Priority Data
Apr. 9, 2008   (JP) ................................. 2008-101267

(51) Int. Cl.
*H04L 9/00*          (2006.01)
(52) U.S. Cl.
USPC .......................................................... 380/42
(58) Field of Classification Search
USPC .................................................. 380/42, 259
See application file for complete search history.

(56) References Cited

U.S. PATENT DOCUMENTS

| | | | |
|---|---|---|---|
| 7,000,113 B1 * | 2/2006 | Linnartz ....................... | 713/176 |
| 2002/0191625 A1 * | 12/2002 | Kelly et al. .................... | 370/412 |
| 2006/0245589 A1 * | 11/2006 | Pinder ............................. | 380/42 |
| 2007/0217604 A1 | 9/2007 | Yanamoto | |

FOREIGN PATENT DOCUMENTS

| | | | |
|---|---|---|---|
| EP | 067444 A1 * | 9/1995 | |
| JP | 2004-362704 A | 12/2004 | |
| JP | 2007-249077 A | 9/2007 | |

* cited by examiner

*Primary Examiner* — William S. Powers
*Assistant Examiner* — Dant Shaifer Harriman
(74) *Attorney, Agent, or Firm* — Lerner, David, Littenberg, Krumholz & Mentlik, LLP (57) ABSTRACT

An encrypted-stream processing circuit includes: a decryption mechanism decrypting an encrypted stream; a stream-data processing mechanism separating a plurality of packets included in a stream decrypted by the decryption mechanism in accordance with a packet identifier identifying the packet, and creating a partial stream by extracting a part from the stream under the control of a CPU (Central Processing Unit); and an encryption mechanism encrypting the partial stream, wherein the decryption mechanism, the stream-data processing mechanism, and the encryption mechanism are included in a packaged integrated circuit, and are connected to the CPU through a bus.

20 Claims, 8 Drawing Sheets

FIG. 2

```
DTCP_descriptor() {
  descriptor_tag 8bits 0x88
  descriptor_length 8bits
  CA_System_ID 16bits 0x0fff
  for (I=0;I<descriptor_length-2;i++) {
    private_data_byte 8bits bslbf
  }
}
private_data_type{
Reserved 1bit
Retention_Move_mode 1bit
Retention_State 3bits
EPN 1bit
DTCP_CCI 2bits
Reserved 5bits
Image_Constraint_Token 1bit
APS 2bits
}
```

ENCRYPTED STREAM PROCESSING CIRCUIT AND METHOD OF PROCESSING ENCRYPTED STREAM

The present application claims priority from Japanese Patent Application No. JP 2008-101267, filed in the Japanese Patent Office on Apr. 9, 2008, the entire content of which is incorporated herein by reference.

BACKGROUND OF THE INVENTION

1. Field of the Invention

The present invention relates to an encrypted stream processing circuit and a method of processing an encrypted stream. More particularly, the present invention relates to an encrypted stream processing circuit and a method of processing an encrypted stream, which are capable of processing an encrypted stream at a high speed.

2. Description of the Related Art

To date, when a stream of a content protected by copyright is transmitted through a bus connected to a CPU (Central Processing Unit), there has been a constraint that it is necessary to encrypt the stream.

Accordingly, when the CPU receives an encrypted stream, it is necessary for the CPU to internally decrypt the stream, to perform predetermined necessary processing on the stream, then to encrypt the stream having subjected to the processing, and to output the stream. That is to say, the CPU performs decryption processing on the stream, predetermined processing on the stream, and encryption processing on the stream by software.

However, execution of such processing by software gives heavy load on the CPU, and thus it is difficult for a CPU having a low processing power to perform processing at a high speed. Also, in order to perform processing at a high speed, a relatively high-speed and expensive CPU becomes necessary.

For example, Japanese Unexamined Patent Application Publication No. 2004-362704 has disclosed a data recording and playback apparatus which protects target copyright without changing copyright protection information described in a stream, and a description has been given that it is not easy to perform processing for rewriting copyright protection information.

SUMMARY OF THE INVENTION

As described above, when a stream of a content protected by copyright is transmitted through a bus, it is necessary for a CPU to encrypt the stream before transmission. Thus, it has been difficult for the CPU to process an encrypted stream at a high speed.

The present invention has been made in view of such circumstances, and it is desirable to process an encrypted stream at a high speed.

According to an embodiment of the present invention, there is provided an encrypted-stream processing circuit including: decryption means for decrypting an encrypted stream; stream-data processing means for separating a plurality of packets included in a stream decrypted by the decryption means in accordance with a packet identifier identifying the packet, and creating a partial stream by extracting a part from the stream under the control of a CPU (Central Processing Unit); and encryption means for encrypting the partial stream, wherein the decryption means, the stream-data processing means, and the encryption means are included in a packaged integrated circuit, and are connected to the CPU through a bus.

According to another embodiment of the present invention, there is provided a method of processing an encrypted stream, the method including the steps of: decrypting an encrypted stream; separating a plurality of packets included in a stream decrypted in accordance with a packet identifier identifying the packet, and creating a partial stream by extracting a part from the stream under the control of a CPU (Central Processing Unit); and encrypting the partial stream, wherein the individual steps of processing are performed in a packaged integrated circuit connected to the CPU through a bus.

In an embodiment of the present invention, an encrypted stream is decrypted, a plurality of packets included in the stream are separated in accordance with a packet identifier identifying the packet, a partial stream is created by extracting a part of the stream under the control of a CPU, and the partial stream is encrypted. Such processing is performed in a packaged integrated circuit connected to the CPU through a bus.

By an embodiment of the present invention, it is possible to process an encrypted stream at a high speed.

DESCRIPTION OF THE PREFERRED EMBODIMENTS

In the following, a detailed description will be specifically given of an embodiment of the present invention with reference to the drawings.

Figure 1:
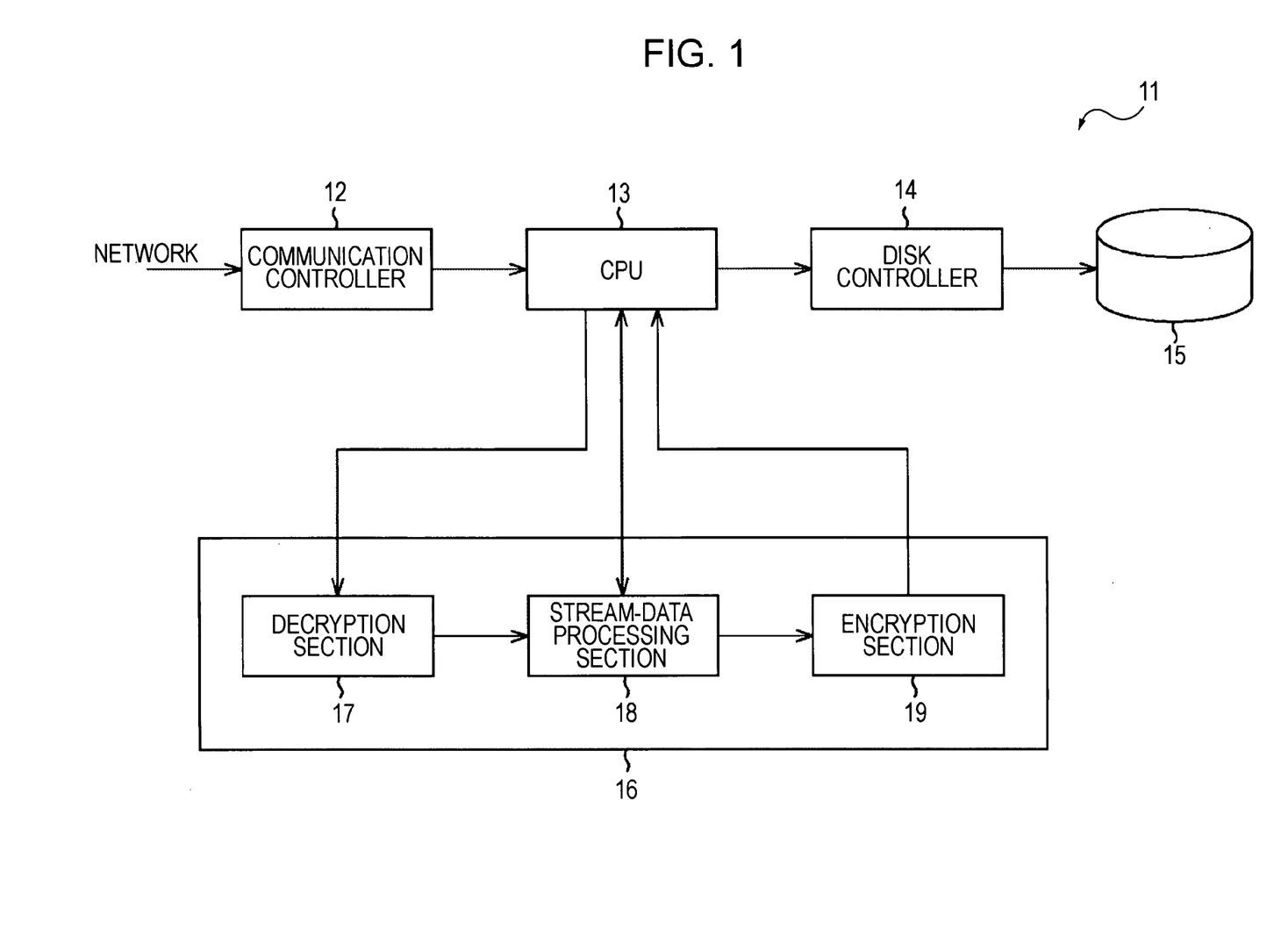
FIG. 1 is a block diagram illustrating an example of a configuration of a content processing apparatus according to an embodiment of the present invention.

FIG. 1 is a block diagram illustrating an example of a configuration of a content processing apparatus according to an embodiment of the present invention.

In FIG. 1, a content processing apparatus 11 includes a communication controller 12, a CPU 13, a disk controller 14, a recording section 15, and an encrypted-stream processing circuit 16. Also, the encrypted-stream processing circuit 16 includes a decryption section 17, a stream-data processing section 18, and an encryption section 19.

The communication controller 12 is a control section controlling communication through a network, for example an IEEE(Institute of Electrical and Electronics Engineers)802.3 Ethernet, an IEEE802.11 wireless network, etc., and transmits and receives data through the network. For example, if a content in the Transport Stream format with copyright is encrypted and delivered, the communication controller 12 receives the encrypted content (in the following, called an encrypted AV (Audio Visual) stream as necessary), and supplies the stream to the CPU 13.

The CPU 13 supplies the encrypted AV stream supplied from the communication controller 12 to the decryption section 17 of the encrypted-stream processing circuit 16, controls the stream-data processing section 18 of the encrypted-stream processing circuit 16, and performs necessary processing on the encrypted AV stream. Also, when the encrypted AV stream having been subjected to the processing by the stream-data processing section 18 is supplied from the encryption section 19 of the encrypted-stream processing circuit 16, the CPU 13 supplies the encrypted AV stream to the disk controller 14.

The disk controller 14 is a control section controlling input and output of data recorded in the recording section 15. For example, the disk controller 14 records the encrypted AV stream supplied from the CPU 13 into the recording section 15.

The recording section 15 is, for example a hard disk drive, a recording medium, such as a DVD (Digital Versatile Disc), a Blu-Ray Disc, etc., and records the encrypted AV stream under the control of the disk controller 14.

The encrypted-stream processing circuit 16 is connected to the CPU 13 through a PCI (Peripheral Component Interconnect) bus, a USB (Universal Serial Bus), etc., and performs necessary processing on an encrypted AV stream under the control of the CPU 13. Here, the encrypted-stream processing circuit 16 is a packaged integrated circuit including the decryption section 17, the stream-data processing section 18, and the encryption section 19. Accordingly, it is not allowed to obtain data sent and received among the decryption section 17, the stream-data processing section 18, and the encryption section 19 from the outside.

The encrypted AV stream is supplied from the CPU 13 to the decryption section 17 through a bus. The decryption section 17 decrypts the encrypted AV stream using, for example a preset decryption key, and supplies a plaintext AV stream to the stream-data processing section 18.

The stream-data processing section 18 performs predetermined processing on the AV stream from the decryption section 17 under the control of the CPU 13, and supplies the processed AV stream to the encryption section 19.

The encryption section 19 encrypts the AV stream supplied from the stream-data processing section 18 using a preset encryption key, and supplies the encrypted AV stream to the CPU 13.

Here, a description will be given of processing performed in the stream-data processing section 18.

The stream-data processing section 18 performs stream separation processing, partial-stream creation processing, map-information creation processing, copyright-information rewriting processing, and time-stamp addition or deletion processing, etc.

In the stream separation processing, namely so-called Demux processing, the stream-data processing section 18 analyzes the AV stream supplied from the decryption section 17, and detects a PAT (Program Association Table) whose PID (Packet Identifier) is determined to be 0x0000. Then, the stream-data processing section 18 obtains a PID of a PMT (Program Map Table) described in the PAT. In the PMT, PIDs of the TS (Transport Stream) packets including a video, an audio, a PCR (Program Clock Reference), etc., are described.

Here, for a standard TS packet without a time stamp, a PID described in the PMT includes a beginning 8-bit sync byte (=0x47), 3 bits including each 1 bit of transport_error_indicator, payload_unit_start_indicator, and transpor_priority, and the following 13 bits. Also, for a TS packet to which a time stamp is added, a time stamp of 32 bits (4 bytes) is included immediately before a sync byte. In this regard, whether a time stamp is added to a TS packet or not can be normally recognized at the time of transmitting and receiving an AV stream. However, for example when it is unclear whether a time stamp is added to a TS packet, it is possible for the stream-data processing section 18 to determine whether a time stamp is added to a TS packet on the basis of a repetition cycle of the sync byte=0x47.

Next, the stream-data processing section 18 separates TS packets from the AV stream in accordance with the PID described in the PMT. For example, the stream-data processing section 18 separates individual TS packets on the basis of the PID of the packets including the PID of packets, such as PAT, PMT, PCR, and DIT (Discontinuity Information Packet), which are used for playback processing of the AV stream, the PID of a packet including a video, and the PID of a packet including an audio.

Also, in the processing for creating a partial stream, the stream-data processing section 18 creates a partial stream including a TS packet on a content to be recorded into the recording section 15 in the content processing apparatus 11. That is to say, the stream-data processing section 18 deletes TS packets other than the TS packets on the content to be recorded into the recording section 15 from the AV stream supplied from the decryption section 17 to create a partial stream.

Here, the PID of the TS packets on the content to be recorded in the recording section 15, for example, the PID of the TS packets of PAT, PMT, PCR, and DIT (Discontinuity Information Packet), etc., the PID of a TS packet including a video, and the PID of a TS packet including an audio are notified (specified) by the CPU 13 to the stream-data processing section 18. Also, for a standard TS packet without a time stamp, the stream-data processing section 18 deletes a TS packet of 188 bytes having a PID identified to be deleted. For a standard TS packet with a time stamp, the stream-data processing section 18 deletes a TS packet of 192 bytes having a PID identified to be deleted. Thus, the TS packets which are not necessary to be recorded in the recording section 15 are not supplied to the encryption section 19.

Also, in the processing for creating map information, the stream-data processing section 18 analyzes an AV stream, detects a position of a TS packet including an Indicator of a Picture Header (I-Picture) and a PTS (Presentation Timestamp), etc., and creates map information having a description of position information (Packet Number) thereof. The stream-data processing section 18 supplies the map information having a description of the position information of the TS packet including an Indicator of a Picture Header, a PTS, etc., and information of the attributes of those TS packets to the CPU 13.

By creating such map information, the CPU 13 can perform processing, such as search, skip playback, etc., when playing back the encrypted AV stream recorded in the recording section 15. That is to say, by performing processing, such as search, skip playback, etc., with reference to the map information, the CPU 13 can perform processing faster than performing such processing while decrypting the encrypted AV stream.

In this regard, a description will be given later of processing for detecting a position of a TS packet including Indicator of a Picture Header (I-Picture) with reference to FIG. 4. Also, a description will be given later of processing for detecting a position of a TS packet including a PTS with reference to FIG. 5. In this regard, if, for example, deletion of Null Packet (a TS packet whose PID=0x1FFF), etc., is performed in the processing of creating a partial stream, position information after the processing is described in the map information.

Also, in the copyright-information rewriting processing, for example, if a PMT of an AV stream includes a DTCP (Digital Transmission Content Protection) Descriptor as copyright information, the stream-data processing section 18 rewrites the DTCP descriptor on the basis of the DTCP descriptor thereof.

Figure 2:
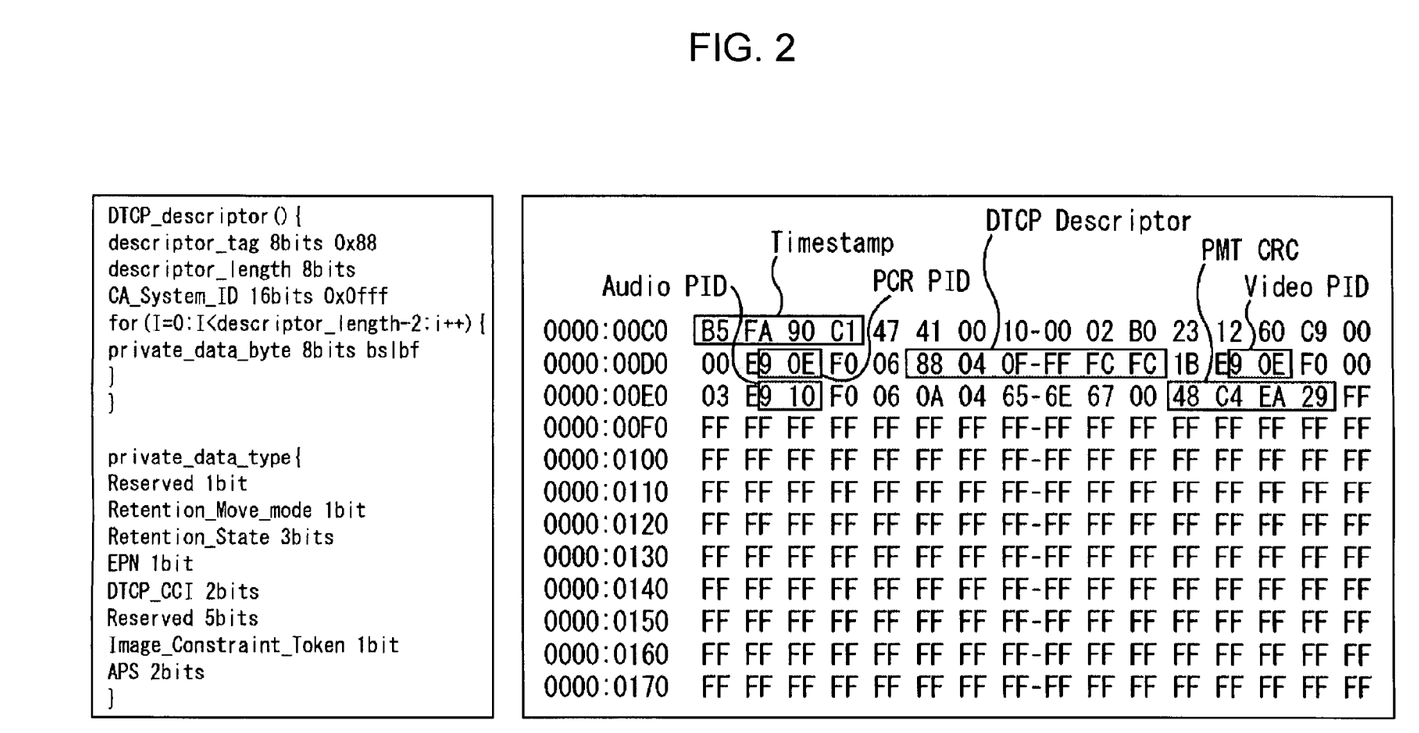
FIG. 2 is a diagram illustrating an example of a DTCP descriptor described in a PMT.

For example, FIG. 2 illustrates an example of a DTCP descriptor described in a PMT.

For example, as shown on the right side of FIG. 2, if a DTCP descriptor is "0x88 04 0F FF FC FC", it indicates that the AV stream to be processed is a copy-free content.

Also, for example, if a DTCP descriptor of an AV stream to be processed is "0x88 04 0F FF FE FC", it indicates that the AV stream to be processed is a copy-once content. When recording a copy-once content into a recording section 15, the stream-data processing section 18 rewrites the DTCP descriptor to "0x88 04 0F FF FD FC", which indicates a content of no more copies.

Here, the stream-data processing section 18 searches the TS packets having a PMT description for "0x88 04 0F FF Fx FC". Note that x in Fx means "don't care". That is to say, this is because it is not clear what is x in Fx at the time of searching.

By the stream-data processing section 18 supplying the result of the search of "0x88 04 0F FF Fx FC" to the CPU 13, the CPU 13 can grasp the DTCP Descriptor of the encrypted AV stream without grasping the content (video, audio, etc.) of the encrypted AV stream. And the CPU 13 instructs the stream-data processing section 18 to rewrite "Fx" on the basis of the search result from the stream-data processing section 18. Also, this allows the CPU 13 to grasp whether there is a DTCP Descriptor in the encrypted AV stream or not.

In this regard, as described above, when a stream of a content protected by copyright is transmitted through a bus connected to a CPU, there is a constraint that it is necessary to encrypt the stream, and to transmit the steam. However, it is not inhibited to send auxiliary information of a content by plaintext, which is not video and audio data of a PAT, a PMT, etc. Accordingly, only TS packets including PAT, PMT, etc., may be supplied to the CPU 13, the CPU 13 may rewrite the DTCP descriptor, and then may supply the stream to the stream-data processing section 18.

Also, in the time-stamp addition or deletion processing, the stream-data processing section 18 adds a time stamp to a TS packet without a time stamp, and deletes a time stamp from a TS packet with a time stamp.

A TS packet with a time stamp is 192 bytes long. Thus, for example, when the stream-data processing section 18 deletes a time stamp from a TS packet with a time stamp, the stream-data processing section 18 deletes a beginning four bytes for each 192 bytes of the AV stream.

Also, when the stream-data processing section 18 adds a time stamp to a TS packet, a PCR (Program clock Reference) is used for a calculation reference of time, and thus the stream-data processing section 18 searches a packet including a PCR, and calculates a time stamp of a 27-MHz clock counter on the basis of the PCR value of the packet. For example, a PCR is data of 42 bits in total, which includes a first 33 bits containing a 90-kHz counter value, and the remaining 9 bits containing a 27-MHz counter value. Thus, for example a time stamp value of 32 bits is expressed by the following expression (1).

$$[\text{32-bit Timestamp value}]=([\text{beginning 33-bit value of PCR}]*300+[\text{remaining 9-bit value}]) \bmod 2\textasciicircum 32 \quad (1)$$

In this regard, Blu-ray uses 30-bit time stamp, and thus the 30-bit time stamp is expressed by the following example (2).

$$[\text{30-bit Timestamp value}]=([\text{beginning 33-bit value of PCR}]*300+[\text{remaining 9-bit value}]) \bmod 2\textasciicircum 30 \quad (2)$$

Also, for each TS packet between TS packets including a PCR, the time stamp values of the packets before and after are evenly divided on the basis of the time stamp values of the TS packets including a PCR before and after that TS packet, and the divided values are used. For example, the CPU 13 specifies a time stamp value of four bytes to be added to the beginning or each TS packet, and specifies a value for incrementing the time stamp, and thus it is possible to automatically set a time stamp value of each TS packet between TS packets including a PCR.

In this manner, the stream-data processing section 18 performs the stream separation processing, the partial-stream creation processing, the map-information creation processing, the copyright-information rewriting processing, and the time-stamp addition or deletion processing, etc.

Figure 3:
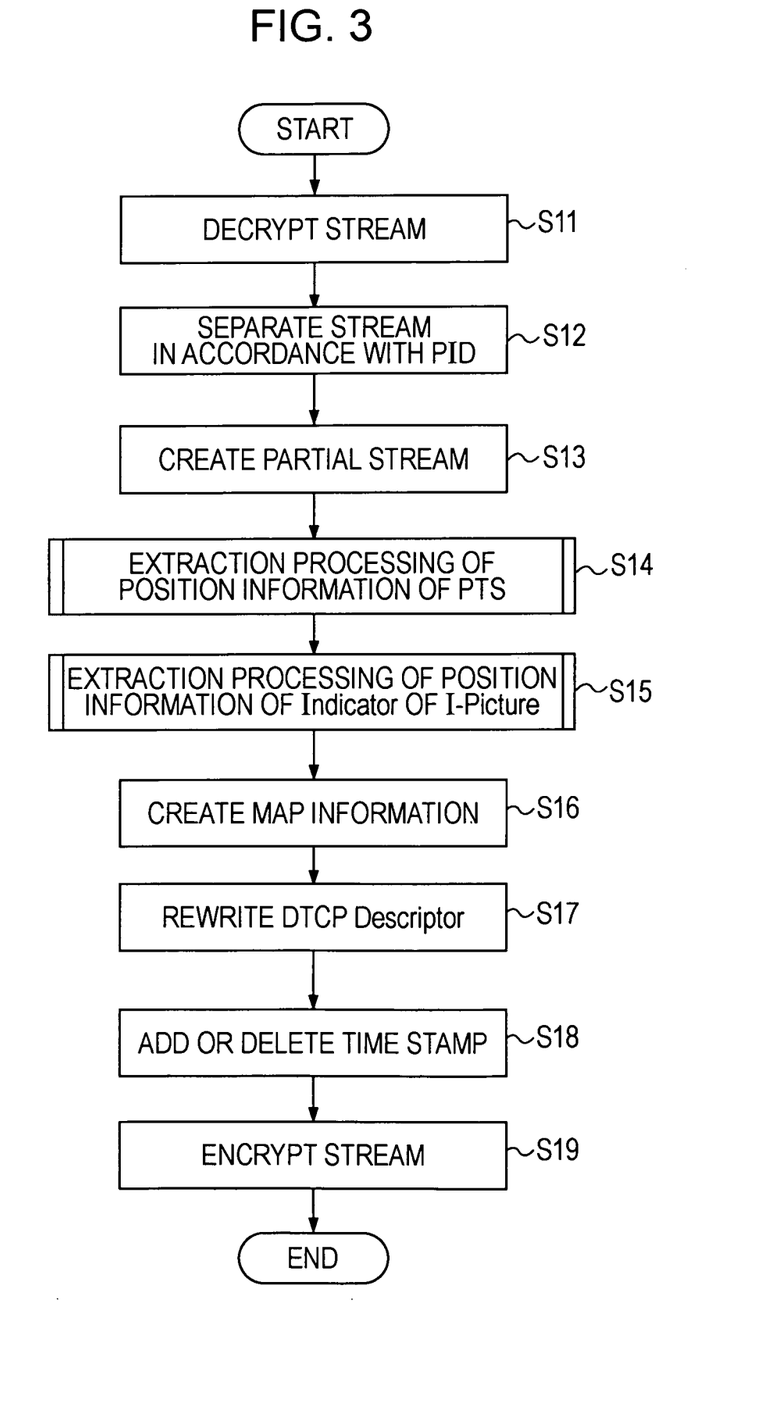
FIG. 3 is a flowchart illustrating processing performed on an encrypted AV stream in an encrypted-stream processing circuit 16.

Next, FIG. 3 is a flowchart illustrating processing performed on an encrypted AV stream in an encrypted-stream processing circuit 16 in FIG. 1.

For example, when an encrypted AV stream delivered through a network is received by the communication controller 12, and is supplied to the decryption section 17 of the encrypted-stream processing circuit 16 through the CPU, the processing is started. In step S11, the decryption section 17 decrypts the encrypted AV stream supplied through the CPU 13, and supplies a plaintext AV stream to the stream-data processing section 18.

After the processing of step S11, the processing proceeds to step S12. The stream-data processing section 18 analyzes the AV stream supplied from the decryption section 17, and obtains a PAT and a PMT. The stream-data processing section 18 separates packets included in the AV stream in accordance with the attribute of the PID described in the PMT, and the processing proceeds to step S13.

In step S13, the CPU 13 notifies a PID of a packet necessary to be kept as a partial stream to the stream-data processing section 18, and the stream-data processing section 18 creates the partial stream in accordance with the PID. That is to say, the stream-data processing section 18 deletes packets that are not necessary to be kept as a partial stream by each packet.

After the processing of step S13, the processing proceeds to step S14. The stream-data processing section 18 analyzes the partial stream created by step S13, and performs extraction processing (FIG. 4) of the position information of a PTS included in the partial stream.

In step S15, the stream-data processing section 18 analyzes the partial stream created by step S13, and performs extraction processing (FIG. 5) of the position information of Indicator of I-Picture included in the partial stream.

After the processing of step S15, the processing proceeds to step S16. The stream-data processing section 18 creates map information having a description of the position information of the PTS extracted by the processing of step S14 and the position information of Indicator of I-Picture extracted by the processing of step S15. The stream-data processing section 18 supplies the map information to the CPU 13, and the processing proceeds to step S17.

In step S17, the stream-data processing section 18 performs processing for rewriting DTCP Descriptor on the basis of the DTCP Descriptor described in the PMT obtained by step S12. For example, if a DTCP Descriptor meaning "copy once" is described in the PMT, the stream-data processing section 18 performs processing for rewriting the DTCP Descriptor to mean "No More Copies".

After the processing of step S17, the processing proceeds to step S18. The stream-data processing section 18 calculates a value which makes a time interval of each packet equal on the basis of an interval of the PCR included in the partial stream under the control of the CPU 13, and adds the value to each packet as a time stamp. Alternatively, the stream-data processing section 18 deletes a time stamp already added to each packet under the control of the CPU 13.

After the processing of step S18, the processing proceeds to step S19. The stream-data processing section 18 supplies the AV stream, which has been subjected to the processing from step S12 to step S18 to the encryption section 19. The encryption section 19 encrypts the AV stream from the stream-data processing section 18, and supplies the encrypted AV stream to the CPU 13.

As described above, in the content processing apparatus 11, the encrypted-stream processing circuit 16, which is connected through the CPU 13 and a bus, decrypts an encrypted AV stream, performs predetermined processing on the AV stream, encrypts the AV stream after the processing, and then outputs the stream. Thus, a plaintext AV stream is not transmitted or received through the bus. Also, it is possible to perform processing on the encrypted AV stream at a higher speed than the CPU 13 performing processing on the encrypted AV stream by software.

In this manner, in the content processing apparatus 11, even if the CPU 13 does not grasp a content of an encrypted AV stream, it is possible to process the encrypted AV stream properly.

Figure 4:
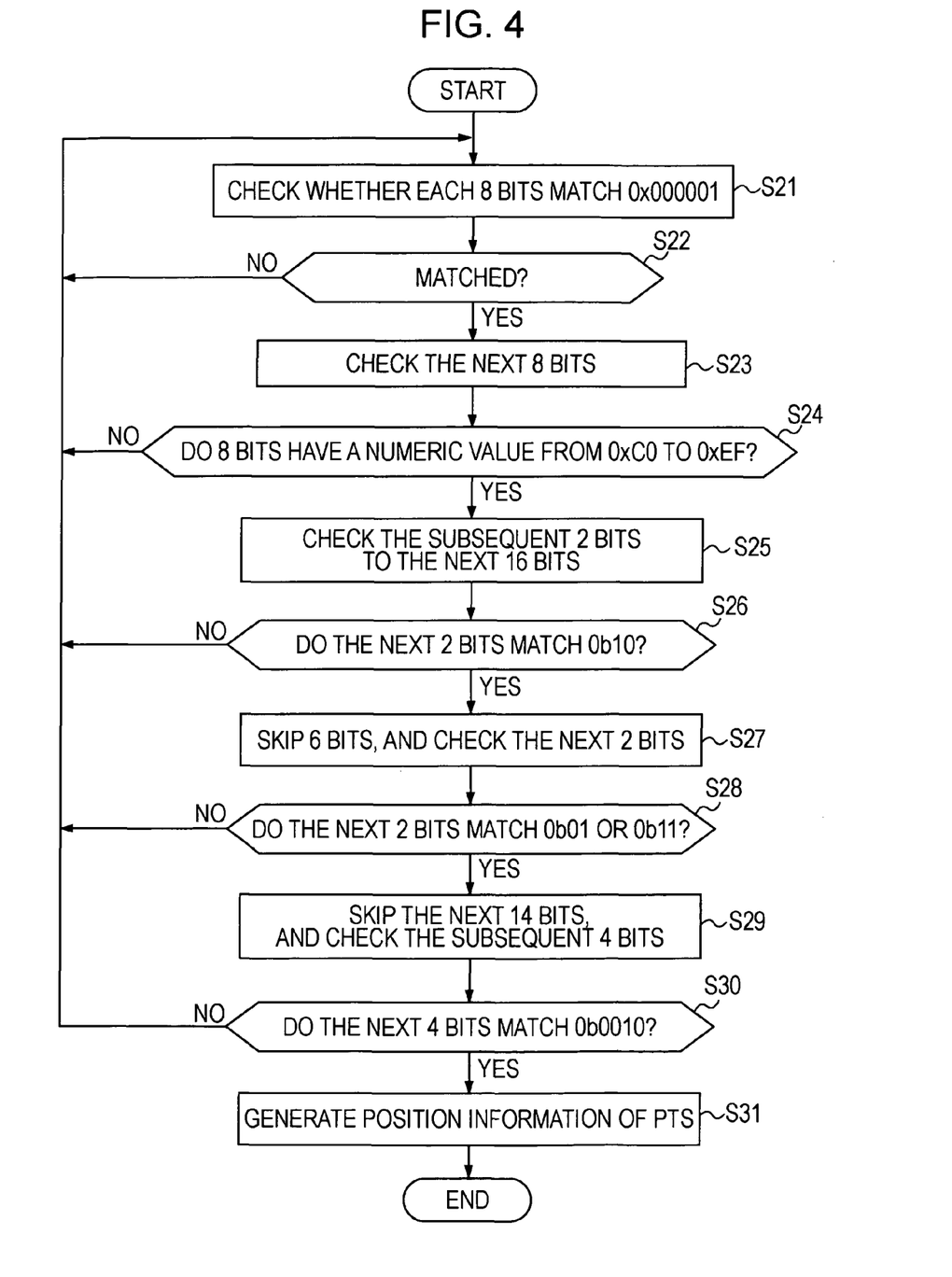
FIG. 4 is a flowchart illustrating processing for extracting position information of PTS in step S14.

Next, FIG. 4 is a flowchart illustrating processing for extracting position information of PTS in step S14 in FIG. 3.

The stream-data processing section 18 processes a bit string included in the AV stream supplied from the decryption section 17 from the beginning bit, and checks each 8 bits whether the value matches 0x000001 in step S21. Here, 0x000001 is a bit string included in the beginning of an AV stream.

After the processing of step S21, the processing proceeds to step S22. The stream-data processing section 18 determines whether the bit string matches 0x000001 as a result of the check in step S21.

In step S22, if the stream-data processing section 18 determines that the bit string does not match 0x000001, the processing returns to step S21, and the same processing is repeated. On the other hand, if the stream-data processing section 18 determines that the bit string matches 0x000001, the processing proceeds to step S23, and the stream-data processing section 18 checks the next 8 bits.

After the processing of step S23, the processing proceeds to step S24. The stream-data processing section 18 determines whether the 8 bits match a numeric value between 0xC0 and 0xEF as a result of the check in step S23.

In step S24, if the stream-data processing section 18 determines that the 8-bit string does not have a value between 0xC0 to 0xEF, the processing returns to step S21, and the same processing is repeated. On the other hand, if the stream-data processing section 18 determines that the 8-bit string has a value between 0xC0 to 0xEF, the processing proceeds to step S25, and the stream-data processing section 18 checks the subsequent 2 bits to the next 16 bits.

After the processing of step S25, the processing proceeds to step S26. The stream-data processing section 18 determines whether the 2 bits match 0b10 as a result of the check in step S25.

In step S26, if the stream-data processing section 18 determines that the 2-bit string does not have a value of 0b10, the processing returns to step S21, and the same processing is repeated. On the other hand, if the stream-data processing section 18 determines that the 2-bit string has a value 0b10, the processing proceeds to step S27, and the stream-data processing section 18 skips 6 bits, and checks the subsequent 2 bits.

After the processing of step S27, the processing proceeds to step S28. The stream-data processing section 18 determines whether the 2 bits match 0b01 or 0b11 as a result of the check in step S27.

In step S28, if the stream-data processing section 18 determines that the 2-bit string does not have a value of 0b01 or 0b11, the processing returns to step S21, and the same processing is repeated. On the other hand, if the stream-data processing section 18 determines that the 2-bit string has a value either 0b01 or 0b11, the processing proceeds to step S29, and the stream-data processing section 18 skips the next 14 bits, and checks the subsequent 4 bits.

After the processing of step S29, the processing proceeds to step S30. The stream-data processing section 18 determines whether the 4 bits match 0b0010 as a result of the check in step S30.

In step S30, if the stream-data processing section 18 determines that the 4-bit string does not have a value of 0b0010, the processing returns to step S21, and the same processing is repeated. On the other hand, if the stream-data processing section 18 determines that the 4-bit string has a value 0b0010, the processing proceeds to step S31.

In step S31, the stream-data processing section 18 generates position information indicating a position of a PTS included in the AV stream to be processed. Specifically, the stream-data processing section 18 extracts 3 bits next to the 4 bits determined to have a value of 0b0010 in step S30 as PTS [32 to 30], skips the next 1 bit, extracts the next 15 bits as PTS [29 to 15], skips the next 1 bit, extracts the next 15 bits as PTS [14 to 0], and uses the PTS [32 to 0] as position information.

After the processing of step S31, the processing of extracting position information of PTS is completed.

Figure 5:
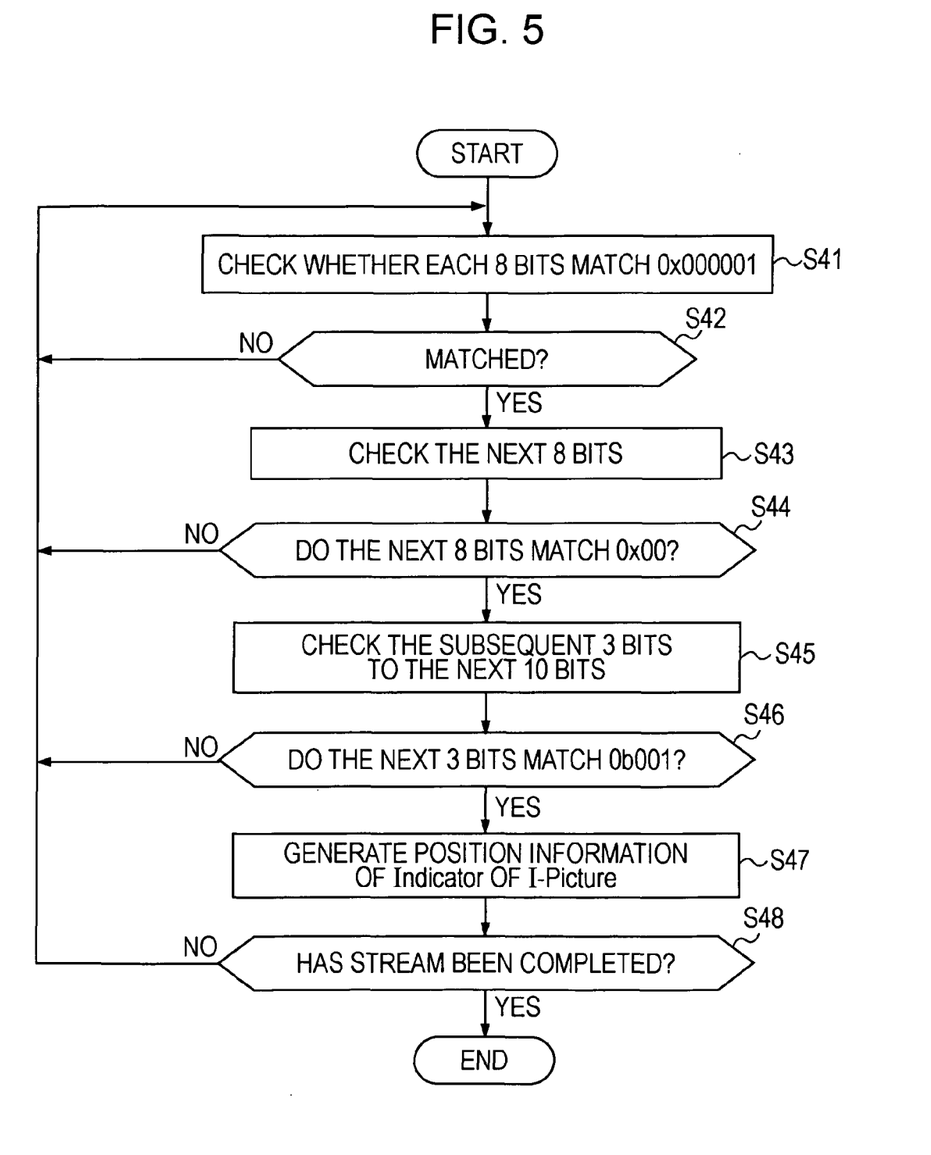
FIG. 5 is a flowchart illustrating processing for extracting position information of Indicator of I-Picture in step S15.

FIG. 5 is a flowchart illustrating processing for extracting position information of Indicator of I-Picture in step S15 in FIG. 3.

The stream-data processing section 18 processes a bit string included in the AV stream supplied from the decryption section 17 from the beginning bit, and checks each 8 bits whether the value matches 0x000001 in step S41.

After the processing of step S41, the processing proceeds to step S42. The stream-data processing section 18 determines whether the bit string matches 0x000001 as a result of the check in step S41.

In step S42, if the stream-data processing section 18 determines that the bit string does not match 0x000001, the processing returns to step S41, and the same processing is repeated. On the other hand, if the stream-data processing section 18 determines that the bit string matches 0x000001, the processing proceeds to step S43, and the stream-data processing section 18 checks the next 8 bits.

After the processing of step S43, the processing proceeds to step S44. The stream-data processing section 18 determines whether the 8 bits match 0x00 as a result of the check in step S43.

In step S44, if the stream-data processing section 18 determines that the 8-bit string does not match 0x00, the processing returns to step S41, and the same processing is repeated. On the other hand, if the stream-data processing section 18 determines that the 8-bit string matches 0x00, the processing proceeds to step S45, and the stream-data processing section 18 checks the subsequent 3 bits to the next 10 bits.

After the processing of step S45, the processing proceeds to step S46. The stream-data processing section 18 determines whether the 3 bits match 0b001 as a result of the check in step S45.

In step S46, if the stream-data processing section 18 determines that the 3-bit string does not have a value of 0b001, the processing returns to step S41, and the same processing is repeated. On the other hand, if the stream-data processing section 18 determines that the 3-bit string has a value 0b001, the processing proceeds to step S47.

In step S47, the stream-data processing section 18 generates the position information of Indicator of I-Picture. For example, the stream-data processing section 18 counts the number of packets after the start of the processing, and generates the number of counts of packets at which 3-bit string has a value 0b001 in step S46 as position information.

After the processing of step S47, the processing proceeds to step S48. The stream-data processing section 18 determines whether the stream to be processed has been completed. For example, if supplying a stream from the decryption section 17 has been completed, and the stream-data processing section 18 has checked all the bits, the stream-data processing section 18 determines that the stream has been completed.

In step S48, if the stream-data processing section 18 determines that the stream to be processed has not been completed, the processing returns to step S41, and the same processing is repeated. On the other hand, if the stream-data processing section 18 determines that the stream to be processed has been completed, the processing of extracting the position information of Indicator of I-Picture is terminated.

In this regard, in the content processing apparatus 11 in FIG. 1, an encrypted AV stream received by the communication controller 12 is supplied to the decryption section 17 of the encrypted-stream processing circuit 16 through the CPU 13. Also, in the content processing apparatus 11, an encrypted AV stream encrypted by the encryption section 19 is supplied to the disk controller 14 through the CPU 13. However, the content processing apparatus 11 may have a configuration other than such a configuration.

Figure 6:
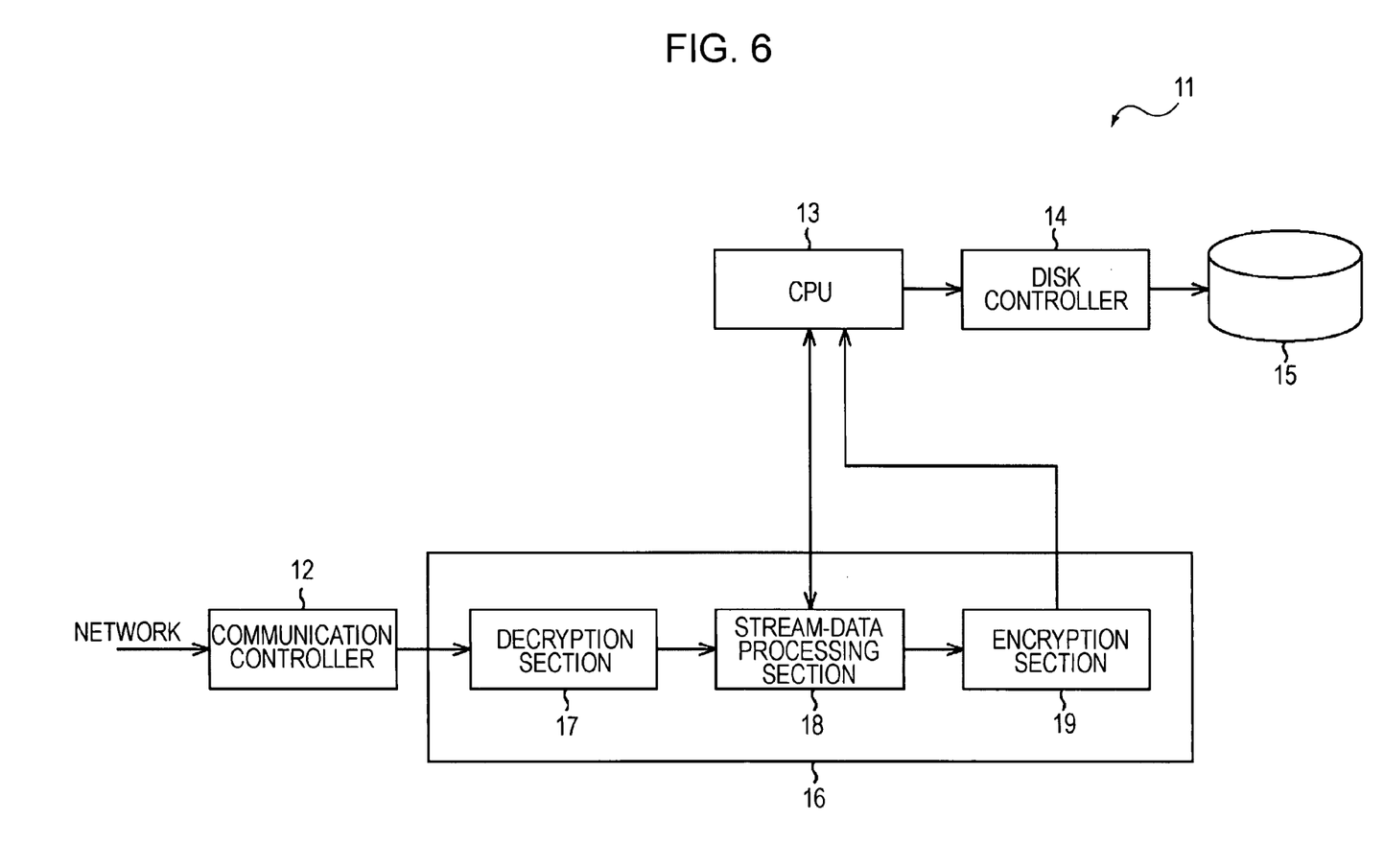
FIG. 6 is a block diagram illustrating an example of a configuration of a content processing apparatus 11 according to another embodiment.

FIG. 6 is a block diagram illustrating an example of a configuration of a content processing apparatus 11 according to another embodiment. In the content processing apparatus 11 in FIG. 6, the communication controller 12 is connected to the decryption section 17 through a bus. When the communication controller 12 receives an encrypted AV stream, the communication controller 12 directly supplies the AV stream to the decryption section 17.

Figure 7:
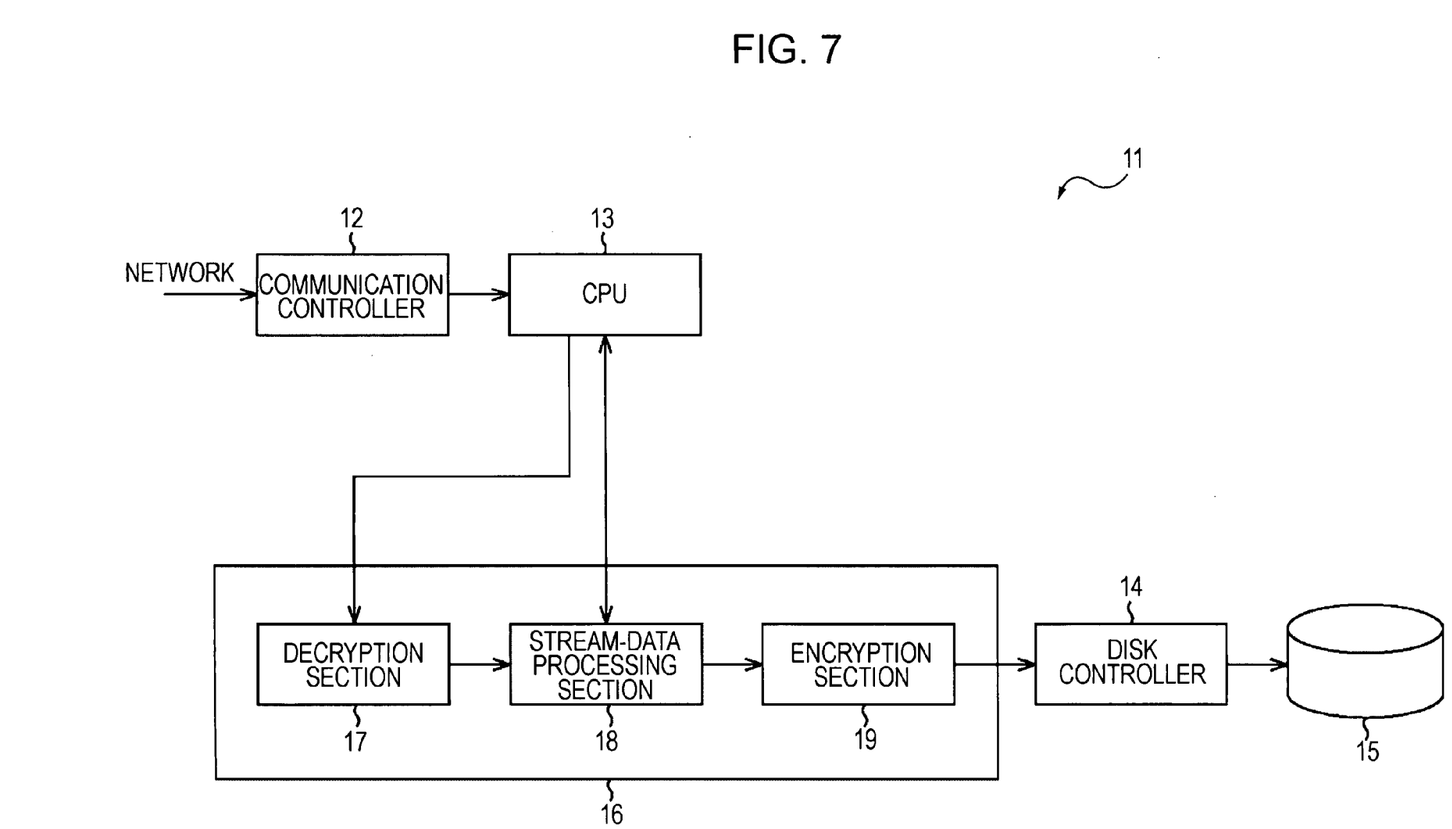
FIG. 7 is a block diagram illustrating an example of a configuration of a content processing apparatus 11 according to still another embodiment.

Also, FIG. 7 is a block diagram illustrating an example of a configuration of a content processing apparatus 11 according to still another embodiment. In the content processing apparatus 11 in FIG. 7, an encryption section 19 is connected to a disk controller 14 through a bus. The encryption section 19 directly supplies the encrypted AV stream to the disk controller 14.

Figure 8:
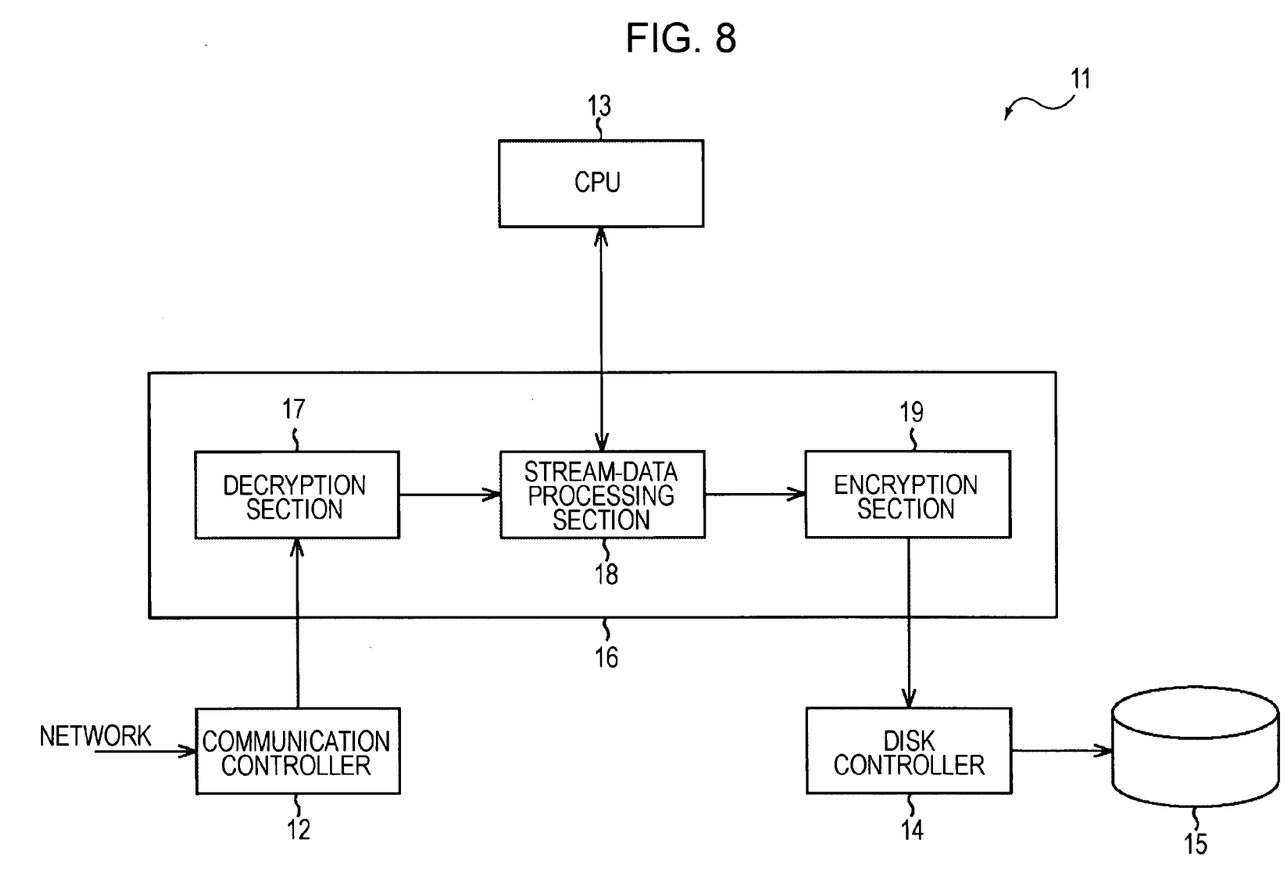
FIG. 8 is a block diagram illustrating an example of a configuration of a content processing apparatus 11 according to still another embodiment.

Also, FIG. 8 is a block diagram illustrating an example of a configuration of a content processing apparatus 11 according to still another embodiment. In the content processing apparatus 11 in FIG. 8, the communication controller 12 is connected to the decryption section 17 through a bus, and an encryption section 19 is connected to a disk controller 14 through a bus. When the communication controller 12 receives an encrypted AV stream, the communication controller 12 directly supplies the AV stream to the decryption section 17, and the encryption section 19 directly supplies the AV stream to the disk controller 14.

As shown in FIGS. 6 to 8, in the content processing apparatus 11, an encrypted AV stream may be input from and output to the encrypted-stream processing circuit 16 in any way as far as processing of the encrypted AV stream is performed by the encrypted-stream processing circuit 16 outside of the CPU 13.

In this regard, in the present embodiment, a description has been given of the case where the content processing apparatus 11 receives an AV stream delivered through a network, and records the stream. However, for example, the content processing apparatus 11 can transmit (deliver) an AV stream recorded in the recording section 15. In this case, an AV stream recorded in the recording section 15 is read by the disk controller 14, and is supplied to the encrypted-stream processing circuit 16 through the CPU 13. The encrypted-stream processing circuit 16 performs, for example rewriting processing of a DTCP Descriptor, processing of deleting a time stamp, and transmits the stream through the CPU 13 and the communication controller 12.

In this regard, each processing described with reference to the above-described flowcharts is not necessarily processed in time series in accordance with the described sequence, but includes processing to be performed in parallel or individually (for example, parallel processing or object processing).

In this regard, an embodiment of the present invention is not limited to the above-described embodiments. It is possible to make various changes without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An encrypted-stream processing circuit, comprising:
   decryption means for decrypting an encrypted stream;
   stream-data processing means for separating a plurality of packets included in a stream decrypted by the decryption means in accordance with a packet identifier identifying the packet, and creating a partial stream by extracting a part from the stream under the control of a CPU (Central Processing Unit); and
   encryption means for encrypting the partial stream,
   wherein the stream-data processing means analyzes the partial stream and extracts position information indicating a position of a presentation time stamp (PTS) and position information indicating a position of an indicator of an I-picture.

2. The encrypted-stream processing circuit according to claim 1, wherein the stream-data processing means creates map information having a description of the position information indicating the position of the presentation time stamp (PTS) and the position information indicating the position of the indicator of an I-picture in the partial stream.

3. The encrypted-stream processing circuit according to claim 1, wherein the stream includes copyright protection information representing the copyright set in a content of the stream, and the stream-data processing means rewrites the copyright protection information as necessary.

4. The encrypted-stream processing circuit according to claim 1, wherein the stream-data processing means deletes a previously added time stamp indicating input timing into a decoder decoding the stream into a plurality of packets included in the stream.

5. The encrypted-stream processing circuit according to claim 1, wherein the encryption means encrypts the partial stream using a preset encryption key.

6. The encrypted-stream processing circuit according to claim 1, wherein the decryption means, the stream-data processing means, and the encryption means are included in a packaged integrated circuit, and are connected to the CPU through a bus.

7. The encrypted-stream processing circuit according to claim 1, wherein the stream-data processing means separates out packets on content to be recorded into a recording section from the decrypted stream, and creates a partial stream from the packets on the content to be recorded into the recording section.

8. The encrypted-stream processing circuit according to claim 1, wherein the stream-data processing means calculates a value making equal a time interval of each packet included in the partial stream based on an interval of a program clock reference (PCR) included in the partial stream and adds the calculated value to each packet included in the partial stream as a time stamp.

9. A method of processing an encrypted stream, the method comprising:
decrypting an encrypted stream;
separating a plurality of packets included in a stream decrypted in accordance with a packet identifier identifying the packet;
creating a partial stream by extracting a part from the stream under the control of a CPU (Central Processing Unit); and
encrypting the partial stream,
wherein the separating step includes analyzing the partial stream and extracting position information indicating a position of a presentation time stamp (PTS) and position information indicating a position of an indicator of an I-picture.

10. The method of processing an encrypted-stream according to claim 9, wherein the encrypting step encrypts the partial stream using a preset encryption key.

11. The method of processing an encrypted-stream according to claim 9, wherein the individual steps of processing are performed in a packaged integrated circuit connected to the CPU through a bus.

12. The method of processing an encrypted-stream according to claim 9, wherein the separating step separates out packets on content to be recorded into a recording section from the decrypted stream, and the creating step creates a partial stream from the packets on the content to be recorded into the recording section.

13. The method of processing an encrypted-stream according to claim 9, further comprising: creating map information having a description of the position information indicating the position of the presentation time stamp (PTS) and the position information indicating the position of the indicator of an I-picture in the partial stream.

14. The method of processing an encrypted-stream according to claim 9, further comprising:
calculating a value making equal a time interval of each packet included in the partial stream based on an interval of a program clock reference (PCR) included in the partial stream, and adding the calculated value to each packet included in the partial stream as a time stamp.

15. An encrypted-stream processing apparatus, comprising:
a CPU (Central Processing Unit); and
an encrypted-stream processing circuit, including:
a decryption mechanism decrypting an encrypted stream,
a stream-data processing mechanism separating a plurality of packets included in a stream decrypted by the decryption mechanism in accordance with a packet identifier identifying the packet, and creating a partial stream by extracting a part from the stream under the control of the CPU (Central Processing Unit), and
an encryption mechanism encrypting the partial stream,
wherein the stream-data processing mechanism analyzes the partial stream and extracts position information indicating a position of a presentation time stamp (PTS) and position information indicating a position of an indicator of an I-picture.

16. The encrypted-stream processing apparatus according to claim 15, wherein the encryption mechanism encrypts the partial stream using a preset encryption key.

17. The encrypted-stream processing apparatus according to claim 15, wherein the decryption mechanism, the stream-data processing mechanism, and the encryption mechanism are included in a packaged integrated circuit, and are connected to the CPU through a bus.

18. The encrypted-stream processing apparatus according to claim 15, wherein the stream-data processing mechanism separates out packets on content to be recorded into a recording section from the decrypted stream, and creates a partial stream from the packets on the content to be recorded into the recording section.

19. The encrypted-stream processing apparatus according to claim 15, wherein the stream-data processing mechanism creates map information having a description of the position information indicating the position of the presentation time stamp (PTS) and the position information indicating the position of the indicator of an I-picture in the partial stream.

20. The encrypted-stream processing apparatus according to claim 15, wherein the stream-data processing mechanism calculates a value making equal a time interval of each packet included in the partial stream based on an interval of a program clock reference (PCR) included in the partial stream and adds the calculated value to each packet included in the partial stream as a time stamp.

* * * * *